Oct. 31, 1961 E. M. ROTHERMEL ET AL 3,006,381
FLEXIBLE CONDUIT
Original Filed Sept. 20, 1956

INVENTOR.
EDWARD M. ROTHERMEL
RUSSELL B. WADDELL JR.
BY
Reuben Wolk
ATTORNEY

United States Patent Office 3,006,381
Patented Oct. 31, 1961

3,006,381
FLEXIBLE CONDUIT
Edward M. Rothermel and Russell B. Waddell, Jr., Waynesville, N.C., assignors to Dayco Corporation, a corporation of Ohio
Original application Sept. 20, 1956, Ser. No. 611,007, now Patent No. 2,822,857, dated Feb. 11, 1958. Divided and this application Apr. 2, 1957, Ser. No. 650,261
2 Claims. (Cl. 138—122)

This application is a division of my copending application, Serial No. 611,007, filed Sept. 20, 1956, now Patent No. 2,822,857, which is a continuation-in-part of application Serial No. 496,507, filed Mar. 24, 1955, now Patent No. 2,949,133.

The present invention relates to flexible conduits and particularly to such conduits as are adapted for use in connection with fluid transfer such as in vacuum cleaners, oxygen and respirating devices, cooling systems and the like.

More specifically, the present invention relates to flexible conduits having a corrugated tubular body having a plastic surfaced circumferential reinforcement such as described in copending applications Serial No. 398,126, now Patent No. 2,782,803; Serial No. 448,722, now Patent No. 2,766,806, and the above-mentioned Patent No. 2,949,133.

In the art of fluid transfer it is often desirable that a flexible conduit which is impervious to the passage of the fluid being transmitted, light in weight, and pleasing in appearance be employed. The flexibility requirements for this type of hose are often severe and extremely critical and it is not uncommon that the hose will be expected to be sufficiently flexible that it may be bent through an angle of 180 degrees without exerting a substantial counterforce to such bending. Notwithstanding the desire for the lightweight and extreme flexibility, however, it is also a necessary requirement of many hoses within this category that they be reinforced against radial collapse so that when, for example, the hose is bent or flexed through substantially 180 degrees, the inside diameter of the conduit will be maintained and no restriction to the flow of the fluid therewithin will arise. It is also essential that hose of this type be able to withstand many repeated flexings of this nature over a long period of time, for years, in fact, without cracking or losing its strength and flexibility.

In order to obtain these desired and necessary features, it has been found that the most practical expedient is to employ a very simple basic conduit construction which consists primarily of a spiral or similar circumferential reinforcing member positioned within an elastomeric tubular body member, the latter being convoluted between the turns of the reinforcing spiral or helix. In order to preserve the relationship between the reinforcing member and the tubular member of the hose according to this basic construction and more specifically to preserve the axial spacing of the individual turns of the reinforcing helix it was previously found desirable to mold or otherwise permanently form the corrugations in the tubular member so that these corrugations surrounded and partially isolated each of the respective turns of the reinforcing member. The individual turns were thus held apart by a distance at least equal to twice the thickness of the tube whenever a force was exerted against these turns which tended to cause them to collapse upon each other and to constrict the flow of the fluid in the hose. Thus, the recent developments in the art of flexible conduits have made available the theoretically desirable simple hose construction involving only an outer tubular body member and an inner reinforcing member.

Such construction involves its own problems however in that the irregular inner conduit surface results in loss of fluid transmission efficiency and the reinforcing member is exposed to the deteriorating effects of any fluid passing through the conduit. In the development of this basic construction involving the tubular member surrounding a helical reinforcement, it was first found that the undesirable corroding and wearing effects upon the reinforcing member of the fluid passing within the conduit could be circumvented by forming the reinforcing coil of a material which was resistant to such influences. Consequently, a helix of a material presenting a plastic surface such as a plastic coated wire was found to be desirable. It was later discovered that by proper coordination of manufacturing procedures and apparatuses, the corrugations of the tubular member exposed to the inner conduit surface as well as those portions of the reinforcing member so exposed could be aligned so that a substantially smooth surface would be provided, thereby eliminating the previously encountered loss of efficiency in the fluid transmission capabilities of the conduit. While these relatively recent developments have eliminated a large majority of the objections to the otherwise desirable basic construction involving tube and reinforcing wire; and while the use of this basic construction did result in improved flexibility and lightweight, it has been recognized that still greater flexibility and durability are desirable.

It is accordingly an object of the present invention to provide a flexible conduit which is light in weight, of pleasing appearance, extremely flexible and yet suitably reinforced against radial collapse.

It is a further object of the present invention to provide such a conduit incorporating the basic construction of an outer elastic tubular member surrounding an inner circumferential reinforcing member.

It is still another object of the present invention to provide such a conduit incorporating a plastic coated wire reinforcing member.

In order to achieve the above and other objects and advantages of the present invention which will be apparent from a reading of the following disclosure, it is proposed to dispense with the previously practiced molding of the tubular hose body around the individual turns of the reinforcing member. It has been discovered that this elimination of the molding or other permanent establishment of the corrugated cross section of the tube eliminates obstacles against the free and unopposed flexing of the conduit which were present in the prior art constructions involving such permanently fixed corrugations. This elimination of the molded corrugation of the tube of course also eliminates the means previously relied upon for preserving the individual turns of the reinforcing member in the desired axially spaced position. The present invention which thus allows for the elimination of this previously considered necessary expedient provides a hose of greatly improved flexibility. At the same time, it further provides for satisfactory spacing of the individual reinforcing turns with the unobvious attendant result of a satisfactory means for holding the individual wire turns in their proper place.

To accomplish the purposes above set forth, the present invention provides an elastic tubular hose body which deviates solely by its inherent elasticity from its normally cylindrical configuration so that the corrugations resulting when such tubular body is positioned around a circumferential reinforcement are not molded or otherwise permanently fixed therein. In order to achieve the desired corrugation, the elastic tubular member is made to have an inside diameter slightly smaller than the outside diameter of the circumferential reinforcement about which it is to be positioned. The smaller tube is then expanded within its elastic limit to allow for the insertion of the circumferential reinforcement whereupon the tube is released and allowed to elastically embrace the reinforcement.

It has been found further that this elastic grasp of the tube upon the individual circumferential reinforcing turns will in fact provide a satisfactory means for holding these turns in their desired uniformly spaced relationship axially of the conduit if the modulus of elasticity of the tube and its original or "at-rest" dimensions are properly related to the dimensions of the reinforcing turns. While the interrelated variables of the elasticity of the tube and the dimensions thereof may be changed within a rather wide range, it has been found that satisfactory positioning of the wire turns may be insured if the tube and circumferential reinforcement are so correlated that the elastic corrugation of the tube as it is released upon the reinforcement will result in a corrugation. As a result, the innermost surface of the inwardly corrgated depressions will lie in substantially the same cylindrical plane as the innermost surfaces of the circumferential reinforcing turns. To assist the elastically corrugated tube in preserving the relative position of the individual turns of the circumferential reinforcement, a suitable adhesive or bonding agent may be applied to either or both contacting surfaces of the tube or the reinforcement.

The adhesive or bonding agent employed for this purpose is preferably of the variety capable of setting or curing at temperatures on the order of room temperature. This is particularly desirable in the case of conduits employing a tubular member of elastic, thermoplastic material since any application of heat to the conduit would result in the plastic flow of the tubular member thereby detracting from its desired elastic engagement with the circumferential reinforcement. A refinement and modification of the present invention however does contemplate the use of a heat responsive adhesive capable of being cured at higher temperatures in that, where the circumferential reinforcement is made to consist of a continuous metallic or other conductive wire surrounded by a plastic coating, an electric current may be passed through the conductive wire thereby to provide localized heating in the immediate area of the wire which is of course the area which is desired to be bonded to the tubular hose body.

Of equal importance are the contributions of the present invention to improvements in the method of manufacture of flexible conduits. The conduit according to the present invention may be manufactured with a minimum of time and only the most elementary equipment. In view of the basic construction involving a tubular sheath and a circumferential reinforcement therewithin and the fact that an elastic relationship between tube and reinforcement is desired, it is necessary only that the tube be expanded so as to allow for the insertion therein of the reinforcing member whereupon the tube may be released to elastically engage the reinforcement. Where the application of an adhesive or bonding agent is contemplated, the same may be readily applied to the inner surface of the tube and/or the outer surface of the reinforcement prior to the release of the former upon the latter and preferably at the time the reinforcing member is being moved into the tube. Where localized heating is desired to vulcanize or cure the adhesive used to permanently affix the tube to the wire turns at the area of their mutual contact, such may be conveniently provided by merely subjecting the extremities of the wire reinforcement to a source of electric current.

The invention thus generally described may be more clearly understood by reference to the following detailed description of certain preferred embodiments thereof in connection with which reference may be had to the appended drawings.

Figure 1:
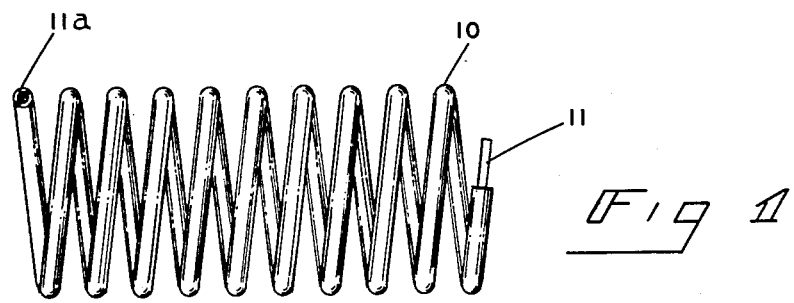
FIGURE 1 is a perspective view in partial cross section of a suitable circumferential reinforcement to be employed in hoses according to the present invention.

Referring now to FIGURE 1, the numeral 10 designates generally one form of circumferential reinforcement suitable for incorporation in hose according to the present invention, this form being a wire or resilient strand or cable 11 having a plastic coating 11a thereon. The core or strand 11 either before or after the application of the coating thereto is subjected to a spring winding operation whereby the reinforcing helix of the continuous spiral configuration is obtained. In the spinning operation by which the helical reinforcement is made, the spacing between the individual turns of the helix should be made to conform substantially to the individual spacing which will be desired in the finished hose. In the case of one form of flexible conduits suitable for use in connection with domestic vacuum cleaners, this spacing between the individual turns of the wire may be approximately ¼ inch. In the case of vacuum cleaner hose having a reinforcement, the individual turns of which are spaced approximately ¼ inch, a desirable wire diameter is from 0.045 inch to 0.051 inch and the plastic coating thereon has a thickness of approximately 0.014 inch. In the case of vacuum cleaner hose this plastic coated wire may be spun or otherwise formed into a helix such as shown in FIGURE 1 having an inside diameter of 1 29/32 inches.

Where the reinforcing helix is initially formed so that the individual convolutions thereof will be axially spaced by one-fourth of an inch, it will be understood that the coil when it is in its relaxed and normal position without any extraneous influences, will have the one-fourth inch spacing which will provide 48 convolutions per axial foot of the helix. During the positioning of this helix within the tubular body member or during other handling of the helix to be hereinafter described, the same may be stretched slightly in an axial direction so as to provide a uniform spacing of the turns and to hold the helix in a substantially straight position while it is being inserted in the tube. Such stretching may result in slightly increasing the spacing between the individual turns thereof which in turn will result in a decrease in the number of convolutions per axial foot. The amount of stretching necessary or required and the influence thereof upon the spacing of the individual turns may, of course, be controlled depending upon the ultimately desired number of reinforcing turns in the finished conduit. It has been found that if the preformed helix is not subjected to any substantial stretching in the manufacturing process, the number of turns therein may be maintained at substantially 48 turns per axial foot up until the coil is surrounded by the elastic tubular member. Once the tubular member is released upon the helix however and is allowed to elastically embrace the individual turns thereof, the elasticity of the tubular member will result in a shortening of the overall length of the helix and a pulling of the individual turns thereof into more closely spaced relationship. For example, the helix may have 48 turns per axial foot prior to the release of the outer tubular member. After this release, the tubular member will have sufficient elasticity to depress portions thereof between the individual turns, sufficiently to cause these portions to lie in the plane of the inner periphery of the helix. The tendency of these portions to cause axial movement of the helix will cause the helix to assume a reduced spacing of from 50 to 54 turns per axial foot. The tube thus exerts a radially inward force against the helix which tends to shorten the helix. Inasmuch as the spacing of the turns is changed from 48 turns per axial foot to between 50 and 54 turns per axial foot, it can be seen that the spacing has diminished by four to twelve percent.

As stated above, there may be instances where improved flexibility at certain points throughout the length of the hose body and particularly at the ends thereof may be desired and this may be obtained at reducing the spacing between the individual turns or, stated otherwise, by increasing the number of turns per axial foot of the helix. It has been found for example that a noticeable effect upon the flexibility of the hose may be achieved by providing for 54 turns per axial foot at these points where greater flexibility is desired; in contrast to 48 turns per axial foot throughout the remainder of the hose body.

About the helix thus formed with the individual helices thereof spaced in their desired position is placed an elastomeric tube 12 which, in the case of a vacuum cleaner hose employing the above-described helix, may be formed to have a one inch inside diameter and to be approximately 0.028 inch in wall thickness. The diameter and wall thickness of the tube 12 are substantially uniform throughout its length.

While this tube 12 may be formed of any elastomeric material, it has been found preferable that a plastic elastomeric material be employed and particularly such thermoplastics as polyvinyl chloride and similar vinyl resins having a good elastic memory. Vulcanized rubber may also be used. The term "plastic" as here employed is meant to include a material that contains as an essential ingredient an organic substance of large molecular weight, is solid in its finished state, and, at some stage of its manufacture or in its processing into finished articles, can be shaped to flow. Such materials are said to have "good elastic memory" when they are capable of retaining for long periods of time, in the case of hoses of this invention, for periods equal to the expected life of the hose, the elastic quality of endeavoring to return to whatever shape and dimensions in which they were originally formed, within the elastic limits of the material.

Such a tube as well as the coating to be applied to the wire may be composed of the following:

| | Parts by weight |
|---|---|
| Polyvinyl chloride resin | 100 |
| Dioctyl phthalate | 70 |
| Lead stabilizer | 3 |
| Filler (e.g. hydrated silicon dioxide) | 10 |

Figure 2:
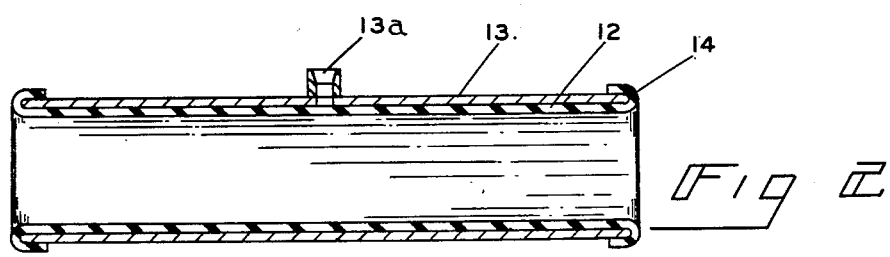
FIGURE 2 is a cross-sectional elevational view of a forming device with the tube ultimately to form the hose body positioned therein.

As shown in FIGURE 2, the elastomeric tube formed as described above is placed within the forming cylinder or expander 13 and the ends of the tube 12 are folded over the ends of the expander 13 as shown at 14 thereby to form a seal between the inner surface of the expander 13 and the outer surface of the tube 12. The expander cylinder 13 is of a larger diameter than the relaxed normal diameter of the tube 12 and is of a greater diameter in fact than the outside diameter of the helix of plastic coated wire such as shown in FIGURE 1. Once the tube 12 is positioned within the expander and the ends of the tube are "cuffed" over the ends of the expander as shown at 14, the air is at least partially removed by means of a vacuum pump or the like via the opening 13a from the space between the smaller diameter tube 12 and the larger expander 13 so that the atmospheric pressure within the tube will cause it to expand against the inner cylindrical surface of the expander 13. Where the elasticity of the tubular member is such that considerable force will be required to expand it radially, or where strong vacuum forming means are not available, it may be desirable to assist the expansion of the tube by subjecting the interior thereof to pressurized air or like fluid along with the application of a vacuum to the exterior thereof as in the case of the expander tube 13. In most cases, the application of the compressed air need only be temporary and at the beginning of the expanding operation since a smaller vacuum may be relied upon to hold the tube in its expanded position once it has reached such position. The temporary application of pressurized fluid to the interior of the tubular member therefore may be accomplished simply by inserting a temporary plug in one or both ends of the tubular member such as 12 while it is in the expander tube 13 and introducing compressed air through the open end of the tube or through an opening in one of the plugs at one of the ends of the tube. Once the pressurized fluid has served its purpose in expanding the tube, the end plugs may be removed to allow the insertion of the helical reinforcement as described below. Where the material forming the tube 12 has a high modulus of elasticity or where it is to be radially expanded to a considerable distance in excess of its normal diameter, it has been found that the "cuffing" of the end of the tube over the ends of the expander tube 13 may be facilitated if the end portions of the tube are enlarged during the initial stages of its manufacture. As a result of this enlarged diameter of the end portions of the tubular hose body member, such portions may be easily formed over the ends of the expander to effect the necessary air seal between the expander tube 13 and the tube 12 to allow for the creation of a vacuum about the tube 12.

Figure 3:
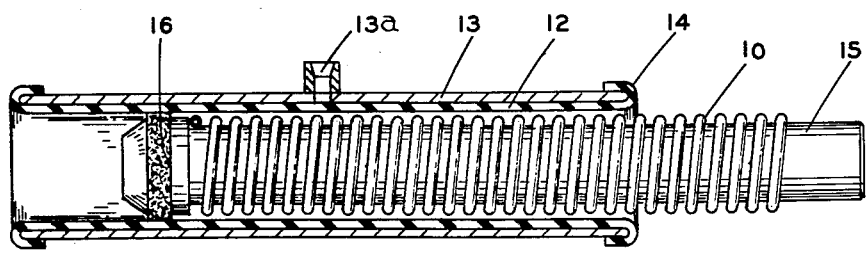
FIGURE 3 is an elevational view in partial cross section of the hose and tube of FIGURE 2 illustrating the insertion of the circumferential reinforcement within the tube.

As shown in FIGURE 3, the wire helix 10 which may be positioned upon a supporting mandrel 15 may then be freely inserted in the elastomeric tube 12 while this latter is held in its expanded position. As further shown in FIGURE 3, the introduction of the helix 10 into the tube 12 may be preceded by the passing through the tube of a sponge or similar plunger 16 saturated with a suitable adhesive or bonding material so as to coat the entire inner surface of the tube 12 with such agent. Once the wire is positioned within the tube and the individual turns thereof are properly spaced, the partial vacuum drawn through the orifice 13a may then be released and the ends or cuffed edges 14 of the tube 12 may be removed from the expander tube 13 whereupon the expanding force will be released and the elastomeric tube 12 will snap back in an effort to assume its previously established normal diameter whereupon it will elastically embrace the helix 10. Where certain solvents or solvent-released adhesives are used and the tube 12 is released before the adhesive dries, the adhesive will act as a lubricant and allow the tube to slide around the reinforcement without disturbing its desired position.

Figure 4:
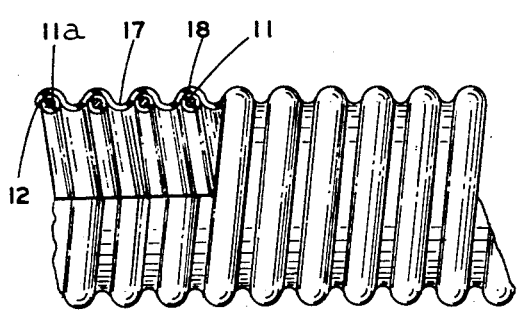
FIGURE 4 is an elevational view in partial cross section of a flexible conduit constructed according to the present invention.

The nature of this elastic engagement of the elastomeric tube 12 with the helical reinforcement which itself has a certain elasticity and resilience is such that the tube 12 will be depressed between the individual turns of the wire helix to provide the corrugated or convoluted configuration shown in FIGURE 4. By carefully controlling the elasticity of the tube and its diameter relative to the diameter of the helix and the cross-sectional diameter of the plastic coated wire forming the same, the inward corrugations 17 may be made to extend substantially to the cylindrical plane defined by the innermost portion of the helix 10. At the same time, of course, the tube will pass over the individual wire turns to form the crests or raised ribs 18 which will pass circumferentially of the tube in conformance with the alignment or positioning of the reinforcing helix therewithin.

Where flexible conduits according to the present invention are formed from a tube of thermoplastic material such that the subjection thereof to elevated temperatures would result in a plastic flow of such material and an attendant loss of the ability of the tube to elastically embrace the reinforcing helix in the manner taught by the present invention, it may still be desirable to employ a heat responsive adhesive such as a thermosetting resin which will require temperatures above the softening or "flow temperature" of the plastic material of the tube. Such adhesives may be employed without detriment to the elasticity of the tube in keeping with the present invention where localized heating only in the area of the contact between the tube 12 and the helix 10 is applied. Where, as in the illustration of FIGURE 1, the helix is composed of a wire or other conductive cable as a core, an electric current may be passed through such conductor to cause sufficient localized heating to cure the adhesive.

Still greater convenience may be imparted where an adhesive according to the following composition is applied to the helix as a coating thereover even before the helix is positioned within the tube 12 or associated or in contact therewith. Such an adhesive is composed of the following ingredients in the weight proportions specified:

| | Parts by weight |
|---|---|
| Polyvinyl chloride resin | 70 |
| Advaresin special CXF (condensed ketone thermoplastic) | 30 |
| Tetrahydrofuran | 450 |
| Methyl ethyl ketone | 450 |

Figure 5:
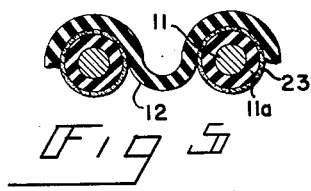
FIGURE 5 is an enlarged cross section through a portion of the body of a conduit according to the present invention showing the manner of association of the tubular body portion thereof with the circumferential reinforcement.

This adhesive is in the form of a solution or suspension which may be applied to the helix and will then dry or harden forming a film 23 thereon subject to being activated when, after the helix is in contact with the tube, heat is applied. This film 23 and its relationship to the tube 12 and the helix 10 of a metallic cable 11 coated with a plastic material 11a is shown in FIGURE 5. Once the tube 12 has been released from the expander cylinder 13 and has elastically embraced the helix 10, the localized heating may be established to cure or to set the adhesive film 23.

It will be understood that the size and elasticity of the tube relative to the size and resilience of the reinforcement may be so controlled that upon the release of these respective components and the free reaction to the influence of each to the other, the innermost portions of the convolutions of the tube may be made to lie in the cylindrical plane of the innermost portions of the reinforcement so that a substantially cylindrical inner hose surface will result. In other instances, however, it may be desired to provide a hose which may be axially stretched or elongated; and, in such case, the relative size and elasticity of the respective components may be so controlled that when the tube is released to embrace the reinforcement, it will axially contract the spaced turns of the latter. The material of the tube causing this contraction being elastic, may of course be stretched upon the application of an axial tension whereupon the tube will lose its corrugation and allow the individual turns of the reinforcement to be extended whereupon the hose will elongate.

While the present invention has been described above in connection with certain specific embodiments thereof, it is to be understood that the specification and particularization has been for purposes of illustration only and in no way limits the scope or application of the invention as it is more particularly defined in the sub-joined claims.

We claim:
1. A corrugated flexible conduit comprising a reinforcing helix having axially spaced turns, and an elastomeric thermoplastic tube having a uniform diameter and wall thickness partially surrounding and embracing said turns and extending inwardly therebetween to only substantially the plane of the inner surface of said helix, said tube being deformed within its elastic limit and exerting a radially inward force against said helix which tends to shorten said helix and constitutes the only force acting upon said helix and the only agent holding the tube and helix together as a unitary conduit.

2. The conduit of claim 1 in which said turns have a spacing which is no less than four and no more than twelve percent less than the spacing of said turns when said helix is in its normal free state.

References Cited in the file of this patent

UNITED STATES PATENTS

| | | |
|---|---|---|
| 2,550,090 | Vance | Apr. 24, 1951 |
| 2,641,302 | Martin et al. | June 9, 1953 |
| 2,715,914 | Roberts | Aug. 23, 1955 |
| 2,739,616 | Duff | Mar. 27, 1956 |
| 2,748,830 | Nash et al. | June 5, 1956 |
| 2,782,803 | Rothermel et al. | Feb. 26, 1957 |